Figure 1:
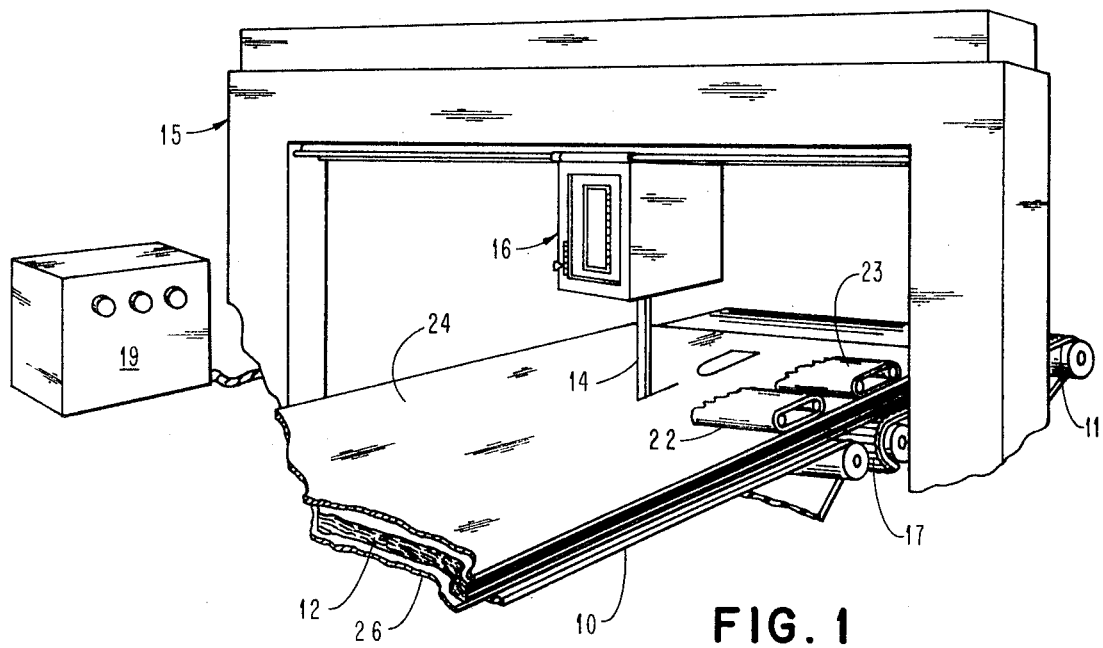

United States Patent

[11] 3,585,888

| [72] | Inventor | James G. Wiatt<br>Cincinnati, Ohio |
|---|---|---|
| [21] | Appl. No. | 835,385 |
| [22] | Filed | June 23, 1969 |
| [45] | Patented | June 22, 1971 |
| [73] | Assignee | Cincinnati Milacron Inc.<br>Cincinnati, Ohio |

[54] MATERIAL RETAINING MEANS FOR MATERIAL CUTTING MACHINE
15 Claims, 2 Drawing Figs.

[52] U.S. Cl. .................................................. 83/14,
83/29, 83/422, 83/424, 83/428, 83/451, 83/925 CC
[51] Int. Cl. ...................................................... B26d 1/28
[50] Field of Search............................................ 83/29, 14,
19, 422, 424, 428, 451, 374, 648—650, 176, 201, 925 CC

[56] References Cited
UNITED STATES PATENTS

| 2,260,573 | 10/1941 | Lorch............................ | 83/29 |
| 3,190,159 | 6/1965 | Wilkie et al................... | 83/201 X |
| 3,495,492 | 2/1970 | Gerber et al.................. | 83/422 X |

*Primary Examiner*—James M. Meister
*Attorney*—Frank C. Leach, Jr.

ABSTRACT: A first member of a nonwoven material is disposed above a plurality of stacked layers of material that are to be cut by longitudinal movement of the material relative to a transversely movable cutting blade. A second member of nonwoven material is disposed beneath the stacked layers of material between the lowermost of the layers of material and the support means for moving the material in the longitudinal direction. Each of the members is of substantially the same length and width as each of the layers of the material. Each of the members has a greater thickness than the thickness of any of the layers of the material being cut.

PATENTED JUN22 1971  3,585,888

INVENTOR
JAMES G. WIATT

BY Frank C. Leach Jr.

ATTORNEY

MATERIAL RETAINING MEANS FOR MATERIAL CUTTING MACHINE

In material cutting machines of the type shown and described in the copending patent application of George W. Sederberg for "Material Cutting Machine Having Reciprocating Cutting Blade Adapted To to Enter Material Without An Entrance Cut," Ser. No. 726,657, filed May 6, 1968, and assigned to the same assignee as the assignee of the present application, the same pattern is cut simultaneously in each of a plurality of stacked layers of material. In the aforesaid Sederberg application, the material is advanced longitudinally relative to the cutting blade while the cutting blade is movable transversely of the material. Furthermore, the angle of the heading of the cutting blade is changed through lifting the cutting blade from cutting engagement with the material. As a result, there is universal movement between the material being cut and the cutting means in the aforesaid Sederberg application.

To prevent any shifting of the layers of material when they comprise a plurality of layers of cloth, for example, a holddown mechanism is utilized with the material cutting machine of the aforesaid Sederberg application to exert a predetermined or selected downward force on the material adjacent the cutting blade. One suitable example of the holddown mechanism is shown and described in the copending patent application of James G. Wiatt and Edward C. Bruns for "Holddown Structure For Material Cutting Machine," Ser. No. 636,968, filed May 8, 1967, now U.S. Pat. No. 3,499,355, and assigned to the same assignee as the assignee of the present application. In the aforesaid Wiatt et al. application, the holddown structure comprises a pair of flexible endless bands disposed on opposite longitudinal sides of the transverse path of the cutting blade and exerting a downward force on the material.

While this pair of secondary, flexible endless bands functions to prevent any slipping of the layers of the material relative to each other adjacent the cutting blade, it has been found that the sudden change between the moderate downward pressure exerted by the holddown bands and the absence of pressure between these holddown bands and the remainder of the material away from the cutting blade produces a steep pressure gradient adjacent the holddown bands. As a result, the material disposed lengthwise of the holddown endless bands on the sides away from the cutting blade tends to become wavy.

This wavy condition can produce some slippage between layers of the material, particularly when the material is soft and compressible. If this slippage were to occur, the same pattern would not be cut in each of the layers of the material even through slippage adjacent the cutting blade is prevented by the holddown bands of the type shown and described in the aforesaid Wiatt et al. application.

The present invention satisfactorily solves the foregoing problem by positioning a member on top of the uppermost of the layers of the material and beneath the holddown bands so as to distribute the change in the force from the holddown bands in a gentle slope rather than in an abrupt step. As a result, the present invention eliminates the problem of the stack of material becoming wavy on the side of the holddown bands away from the cutting blade. Therefore, any potential slippage between the layers of material is prevented by the present invention.

Additionally, a static charge may be produced by some of the materials during spreading of the material that would cause the material to be attracted to the holddown bands. Thus, when the material is cut by the cutting blade, the static charge causes the cut portions of the layers of material to be attracted to the holddown bands. As a result, these cut portions would no longer remain parallel to each other so that the same pattern could not be cut in each of the stacked layers of material.

By disposing the pressure distributing member across substantially the entire length and width of the stacked layers of material through forming the member of substantially the same length and width as each of the stacked layers of material, the member is disposed between the upper layer of the stacked material and the holddown bands. As a result, the static charge on the material cannot cause the material to be attracted to the holddown bands because of the presence of the member therebetween.

In material cutting machines of the type shown and described in the aforesaid Sederberg application, the material is supported on a pair of endless bands or belts, which are driven in unison. These bands are spaced from each other to form a transverse passage therebetween through which the cutting means moves transversely. A pair of throat way sections is disposed adjacent the endless bands to form a continuation thereof and to reduce the size of the transverse passage to a transverse gap. Furthermore, the transverse gap between the throat way sections is closed by a suitable gap closure means shown and described in the aforesaid Sederberg application and is similar to that shown and described in the copending patent application of Edward C. Bruns for "Gap Closer For material Cutting Machine," Ser. No. 636,964, filed May 8, 1967, now U.S. Pat. No. 3,465,630 and assigned to the same assignee as the assignee of the present application.

Since the throat way sections are located with a very minute clearance between each of the endless bands and the cooperating throat way section to permit the endless band to be driven longitudinally without any interference with its cooperating throat way section, the possibility exists that loose threads of material, which has been cut, can be caught between either of the throat way sections and the adjacent endless support band. Likewise, if the bottom layer of material is very thin, it could possibly become caught between either of the throat way sections and the adjacent endless support band during longitudinal advancement of the material. Either of these actions can affect the longitudinal movement of the material so that the desired pattern is not cut in all of the layers of material.

The present invention satisfactorily overcomes the foregoing problem by positioning a member of a nonwoven material between the lowermost layer of the stacked layers of material and the upper surface of the material supporting means. Thus, this member overlies the junction between each of the endless support bands and the cooperating throat way section. Since the member is formed of a nonwoven material, there can be no threads extending therefrom for capture in the space between either of the throat way sections and the adjacent endless support band. Furthermore, the nonwoven material is thicker than any of the layers of the material being cut with its thickness being sufficient so that it cannot enter the space between either of the throat way sections and the adjacent endless band.

By forming this member of a nonwoven material, it will not have any loose threads nor will it tend to curl or roll upon being cut. Therefore, the member will have no free portion capable of being caught in the spaces between either of the throat way sections and the adjacent endless band. By extending the member for substantially the same length and width as each of the stacked layers of the material, the member is effective throughout the entire longitudinal movement of the material relative to the junction of each of the endless bands with its cooperating throat way section.

An object of this invention is to provide an improved material retaining means for a material cutting machine.

Other objects of this invention will be readily perceived from the following description, claims, and drawing.

This invention relates to an improvement for a material cutting machine having cutting means with means to support a plurality of layers of material for cutting by the cutting means. The material cutting machine has means to create relative longitudinal movement between the material and the cutting means and means disposed on each side of the cutting means in the longitudinal direction to exert a downward force on the material being cut. The improvement comprises a member disposed above the uppermost of the layers of the material and supported by the material with the member being of substantially the same length and width as each of the layers of the material. The member has a thickness greater than the thickness of any of the layers of the material being cut and is formed of an unstressed material.

This invention also relates to an improvement for a material cutting machine having cutting means for cutting a plurality of layers of material supported by means having a transverse passage therein into which the cutting means extends to allow movement of one of the material and the cutting means relative to the other in a transverse direction. The material cutting machine also has means to create relative longitudinal movement between the material and the cutting means. The improvement comprises a member disposed beneath the lowermost of the layers of the material and supported by the material supporting means with the member being of substantially the same width and length as each of the layers of the material. The member is formed of an unstressed material and has thickness greater than the thickness of any layer of the material being cut.

This invention further relates to a method of cutting the same pattern in each of a plurality of stacked layers of material by cutting means in which longitudinal and transverse movement occurs between the material and the cutting means with means exerting a downward force on the material on each side of the cutting means in the longitudinal direction. The method comprises positioning a first member of substantially the same length and width as each of the layers of material but thicker than any of the layers of material on the top layer of the layers of material and beneath the downward exerting force means. Both the first member and each of the layers of material are simultaneously cut to produce the same pattern in each of the layers of material.

This invention still further relates to a method of cutting the same pattern in each of a plurality of stacked layers of material by cutting means, which is movable through a transverse passage, with longitudinal and transverse movement occurring between the material and the cutting means. The method comprises positioning a member of substantially the same size and width as each of the layers of material but thicker than any of the layers of material beneath the lowermost of the layers of material. Both the member and each of the layers of material are simultaneously cut to produce the same pattern in each of the layers of material.

Figure 2:
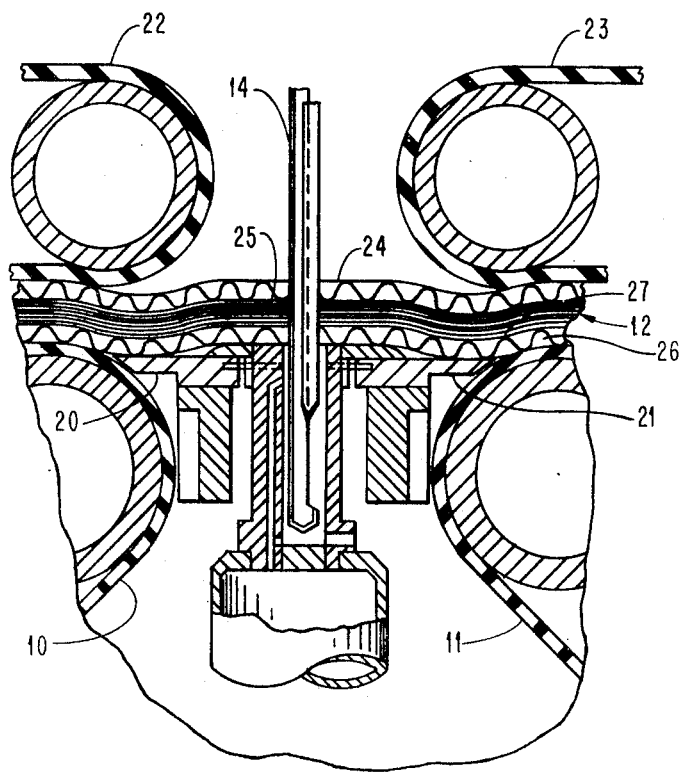

The attached drawing illustrates a preferred embodiment of the invention, in which:

FIG. 1 is a perspective view of a portion of a material cutting machine utilizing the improved material retaining means of the present invention with some parts omitted for clarity purposes; and FIG. 2 is a sectional view through the portion of the cutting machine of FIG. 1 in which the cutting blade moves transversely.

Referring to the drawing and particularly FIG. 1, there is shown a material cutting machine utilizing the improved material retaining means of the present invention. The cutting machine is the type shown and described in the aforesaid Sederberg application and includes a pair of endless bands 10 and 11 on which a plurality of stacked layers of material 12 is supported. The endless bands 10 and 11 are driven in unison to move the material 12 as more particularly shown and described in the aforesaid Sederberg application. The material 12 may be a plurality of stacked layers of cloth, for example.

A cutting blade 14 is supported from a fixed bridge 15 by a support 16. As more particularly shown and described in the aforesaid Sederberg application, the support 16 is adapted to be moved transversely on the bridge 15 whereby the cutting blade 14 moves transversely through a transverse passage 17, which is formed between the adjacent ends of the endless bands 10 and 11. The cutting blade 14 is adapted to rotate about a vertical axis as more particularly shown and described in the aforesaid Sederberg application. The support 16 has an electric motor supported thereon to reciprocate the cutting blade 14.

The movement of the cutting blade 14 in the transverse passage 17, the longitudinal movement of the material 12 relative to the cutting blade 14 by the endless bands 10 and 11, and rotation of the cutting blade 14 about a vertical axis are controlled through a numerical control apparatus 19 as more particularly described in the aforesaid Sederberg application. The cutting blade 14 may have any configuration such as those shown in the aforesaid Sederberg application, for example.

As shown in FIG. 2, the width of the transverse passage 17 is substantially reduced by a pair of throat way sections 20 and 21. The throat way sections 20 and 21 are supported by a table structure as more particularly shown and described in the aforesaid Sederberg and Bruns applications.

The throat way sections 20 and 21 are horizontally spaced from each other to provide a transverse gap therebetween to receive support structure for the cutting blade 14 to permit the cutting blade 14 to move transversely relative to the width of the endless bands 10 and 11 and rotate relative thereto. This insures that the cutting blade 14 may not only traverse the entire width of the material 12, which is supported by the endless bands 10 and 11, but also is capable of rotating relative thereto. The transverse gap may be closed by any suitable means such as that shown and described in the aforesaid Sederberg application.

One suitable type of the hold down mechanism for exerting a predetermined or selected force on the material 12 adjacent the cutting blade 14 is shown and described in the aforesaid Wiatt et al. application. The exerted force is determined by the type of material, the thickness of each of the layers of material, and the total thickness of the material supported on the endless bands 10 and 11.

The holddown structure of the aforesaid Wiatt et al. application includes a pair of secondary, flexible endless bands 22 and 23, which are disposed in vertical spaced relation to the endless support bands 10 and 11, respectively. As shown in FIG. 2, the secondary endless band 22 is disposed on the same side of the cutting blade 14 as the endless band 10 while the secondary endless band 23 is positioned on the same side of the cutting blade 14 as the endless band 11.

As more particularly shown and described in the aforesaid Wiatt et al. application, the endless bands 22 and 23 are adapted to be driven in unison with the endless bands 10 and 11 so that the velocity of the secondary endless band 22 is the same as the velocity of the endless band 10 and the velocity of the endless band 23 is the same as the velocity of the endless band 11. This insures that the endless bands 22 and 23 do not affect the longitudinal movement of the material 12 by the endless bands 10 and 11.

The endless bands 22 and 23 are supported by the upright support standards of the bridge 15 as more particularly shown and described in the aforesaid Wiatt et al. application. This support structure has been omitted from FIG. 1 for clarity purposes.

The improved material retaining means of the present invention includes an upper member 24, which is disposed beneath the secondary endless bands 22 and 23 and on top of the upper surface of the uppermost of the stacked layers of the material 12. The upper member 24 is substantially the same width and length as each of the layers of the material 12.

To distribute the force of the secondary endless bands 22 and 23 smoothly or gently over the material 12 rather than having a steep change at the end of the secondary endless bands 22 and 23 on the sides longitudinally away from the cutting blade 14, the upper member 24 is formed of a material that is thicker than any of the layers of the material 12 and is an unstressed material. Thus, any suitable nonwoven material may be employed.

One preferred example of the material of the upper member 24 is cardboard. Heavy brown paper, if it is thicker than the thickest layer of the stacked layers of the material 12, will suffice since it will sufficiently distribute the load from the secondary endless bands 22 and 23 to prevent the steep change in pressure at each side of the secondary endless bands 22 and 23 away from the cutting blade 14.

If desired, the upper member 24 may have its lower surface 25 formed in a nonsmooth configuration to aid in preventing slippage between the upper member 24 and the upper layer of the material 12. This is not a requisite for satisfactory operation of the present invention but is desirable with very soft compressible materials. Thus, when the upper member 24 is formed of cardboard, the lower surface 25 may be corrugated, for example, to form the nonsmooth surface.

The improved material retaining means of the present invention also includes a lower member 26 which is disposed beneath the lower surface of the lowermost layer of the stacked layers of the material 12 and above the endless support bands 10 and 11. The member 26 is thicker than any of the layers of the material 12. The lower member 26 is preferably of the same length and width as each of the layers of the material 12 and of the upper member 24.

The lower member 26 must be formed of a nonwoven material so that it will not have any threads to be caught between either the endless band 10 and the throat way section 20 or between the endless band 11 and the throat way section 21 during longitudinal movement of the lower member 26 with the material 12 as it is being cut. The lower member 26 also must have sufficient thickness to not be capable of entering the slight space between each of the endless support bands and the cooperating throat way section.

The lower member 26 also must be formed of an unstressed material. This insures that the lower member 26 will not curl when being cut by the cutting blade 14 so that the member 26 will remain in a horizontal plane after it has been cut.

One preferred example of the material of the lower member 26 is cardboard. Likewise, heavy brown paper, if it were thicker than any layer of the stacked layers of the material 12, also could be employed.

If desired, the lower member 26 may have its upper surface 27 formed of a nonsmooth surface to increase the friction between the lower member 26 and the lowermost of the layers of the material 12. Thus, when the member 26 is formed of cardboard, the upper surface 27 may be corrugated, for example, to form the nonsmooth surface.

Considering the operation of the material cutting machine with the improved material retaining means of the present invention, the material 12 is supported on top of the lower member 26, which is initially supported on one of the endless bands 10 and 11. Then, the upper member 24 is disposed on top of the uppermost layer of the stacked layers of the material 12. Next, the secondary endless bands 22 and 23 are moved downwardly into engagement with the upper surface of the upper member 24.

During cutting of the material by the cutting blade 14, the material 12 is advanced longitudinally relative to the cutting blade 14 by driving the endless bands 10 and 11 in unison. This also causes the members 24 and 26 to move in unison with the material 12 whereby the cutting blade 14 simultaneously cuts both the upper member 24 and the lower member 26 in addition to all of the layers of the material 12.

Because of the pressure distribution created by the upper member 24, the stacked layers of the material 12 will not slip relative to each other on the sides of the secondary endless bands 22 and 23 remote from the cutting blade 14. Furthermore, the lower member 26 prevents any of the threads of the cut layers of the material 12 from entering between the endless band 10 and the throat way section 20 or between the endless band 11 and the throat way section 21. Thus, the upper member 24 and the lower member 26 cooperate to prevent any slippage between the stacked layers of the material 12 during cutting. The lower member 26 also prevents the lowermost layer or threads therefrom from being caught between either of the endless support bands and its cooperating throat way section.

Furthermore, since the upper member 24 is positioned between the secondary endless bands 22 and 23 and the upper surface of the uppermost of the layers of the material 12, any static charge on the material 12 cannot cause the material 12 to be attracted to the secondary endless band 22 or 23. Thus, the improved material retaining means of the present invention maintains the layers of the material 12 in the desired position so that the same true pattern is cut in each of the stacked layers of the material 12.

While the present invention has been shown and described as utilized with the material cutting machine of the aforesaid Sederberg application, it should be understood that it may be employed with any material cutting machine in which the material would move longitudinally relative to the cutting blade and in which pressures are exerted downwardly on the material adjacent each side of the cutting blade. Other suitable examples of material cutting machines with which the present invention may be utilized are the material cutting machines shown and described in the copending patent application of Edward C. Bruns for "Material Cutting Machine Having Reciprocating Cutting Blade With Two Axes of Rotation," Ser. No. 726,658, filed May 6, 1968, now U.S. Pat. No. 3,511,124, the copending patent application of George W. Sederberg for "Material Cutting Machine Having Reciprocating Cutting Blade," Ser. No. 636,965, filed May 8, 1967, and the copending patent application of George W. Sederberg for "Material Cutting Machine Having Reciprocating Cutting Blade With A Nonreciprocating Guide," Ser. No. 726,659, filed May 6, 1968, all of these applications are assigned to the same assignee as the assignee of the present application.

It also should be understood that the secondary endless bands 22 and 23 for exerting the holddown force may be of a different type than that shown and described in the aforesaid Wiatt et al. application. For example, the secondary endless bands could be of the type of holddown mechanism more particularly shown and described in the copending patent application of Herman J. Baldwin and Phillip F. Stapf, Jr. for "Holddown Apparatus For Material Cutting Machine," Ser. No. 757,011, filed Sept. 3, 1968 and assigned to the same assignee as the assignee of the present application.

While the present invention has been shown and described with respect to a material cutting machine in which a transverse passage is provided between the endless support bands on which the material is supported, it should be understood that the present invention could be employed in a material cutting machine in which there was not a transverse passage. However, in this arrangement, it would be only necessary to employ the upper member 24 since there would be no type of movement of the material relative to a transverse passage in which the threads of the material or the layers of material could be caught, for example.

The present invention also could have utility where a transverse passage is provided by depressing a single support band. One such structure is shown in U.S. Pat. No. 3,262,348 to James G. Wiatt et al. In this type of arrangement, the lower member 26 would be desirable since there are throat way sections cooperating with the single endless band as it turns directions to form the transverse passage.

It also has been previously suggested to utilize a device for exerting a holddown force between the secondary endless bands 22 and 23 and adjacent the cutting blade 14. Such structures are shown and described in the copending patent applications of George W. Sederberg and James G. Wiatt for "Closure Device For Material Cutting Machine," Ser. No. 789,800, filed Jan. 8, 1969, now U. S. Pat. No. 3,529,503, and Herman J. Baldwin and George W. Sederberg for "Rockable Closure Device For Material Cutting Machine," Ser. No. 789,879, filed Jan. 8, 1969, now U.S. Pat. No. 3,529,501 with both applications assigned to the same assignee as the assignee of the present application. The use of the upper member 24 of the present invention permits these types of structures to move more freely relative to the layers of the material 12 than when these structures are sliding on the upper layer of the material, particularly when the material 12 is formed of a plastic.

The material 12 has been shown and described as a plurality of similar layers of the same material. However, it should be understood that the material 12 could comprise layers of different material with the layers having the same or different thicknesses or layers of the same material of different thicknesses.

The cutting blade 14 has been shown and described as being a reciprocating cutting blade. However, it should be understood that any type of cutting means may be employed to cut the material 12 and the members 24 and 26.

An advantage of this invention is that it insures that the same true pattern is cut in each of the stacked layers of the material. Another advantage of this invention is that it prevents any material or threads of the material from entering between the throat way sections and the endless support bands. A further advantage of this invention is that it prevents the upper layers of the material which is being cut from being attracted by static electricity to the holddown secondary endless bands. Still another advantage of this invention is that any type of desired markings can be made on the upper surface of the upper member without affecting the material to be cut. A still further advantage of this invention is that the upper and lower members cooperate with the cut material to form a type of shipping or transporting container when the cutting of the material has been completed and some type of securing means such as string, for example, is wrapped around the upper and lower members and the material.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What I claim is:

1. In a material cutting machine having cutting means, means to support a plurality of separate unconnected layers of material for cutting by the cutting means, means to create relative longitudinal movement between the material and the cutting means, means disposed on each side of the cutting means in the longitudinal direction to exert a downward force on the material being cut, the improvement comprising:
   a first member disposed above the uppermost of the layers of material and supported by the material;
   said first member being separate from any of the layers of material and unconnected to any of the layers of material;
   said first member being of substantially the same length and width as each of the layers of material;
   and said first member having a thickness greater than the thickness of any layer of the material being cut, said first member being formed of an unstressed material.

2 The improvement according to claim 1 including:
   a second member disposed beneath the lowermost of the layers of material and supported by the material supporting means;
   said second member being separate from any of the layers of material and unconnected to any of the layers of material and said first member;
   said second member being of substantially the same width and length as each of the layers of material;
   and said second member having a thickness greater than the thickness of any layer of the material being cut, said second member being formed of an unstressed material.

3. The improvement according to claim 1 in which said first member is formed of a nonwoven material.

4. The improvement according to claim 2 in which said first and second members are formed of a nonwoven material.

5. The improvement according to claim 1 in which said first member has a nonsmooth surface for contact with the adjacent layer of material to prevent slippage between said first member and the adjacent layer of material.

6. The improvement according to claim 2 in which each of said first and second members has a nonsmooth surface for contact with the adjacent layer of material to prevent slippage between each of said first and second members and the adjacent layer of material.

7. The improvement according to claim 1 in which said first member is formed of cardboard.

8. The improvement according to claim 5 in which said first member is formed of cardboard.

9. The improvement according to claim 2 in which each of said first and second members are formed of cardboard.

10. The improvement according to claim 6 in which each of said first and second members are formed of cardboard.

11. In a material cutting machine having cutting means, means to support a plurality of separate unconnected layers of material for cutting by the cutting means, the material supporting means having a transverse passage therein into which the cutting means extends to allow movement of one of the material and the cutting means relative to the other in a transverse direction, and means to create relative longitudinal movement between the material and the cutting means, the improvement comprising:
   a member disposed beneath the lowermost of the layers of material and supported by the material supporting means;
   said member being separate from any of the layers of material and unconnected to any of the layers of material;
   said member being of substantially the same width and length as each of the layers of material;
   and said member having a thickness greater than the thickness of any layer of the material being cut.

12. The improvement according to claim 11 in which said member is formed of cardboard.

13. A method for cutting the same pattern in each of a plurality of stacked separate unconnected layers of material by cutting means in which longitudinal and transverse movement occurs between the material and the cutting means, said method comprising:
   positioning a first member of substantially the same length and width as each of the layers of material but thicker than any of the layers of material and unconnected to any of the layers of material;
   exerting a downward force on the first member and the material on each side of the cutting means in the longitudinal direction;
   and simultaneously cutting both the first member and each of the layers of material to produce the same pattern in each of the layers of material.

14. The method according to claim 13 including:
   positioning a second member of substantially the same length and width as each of the layers of material but thicker than any of the layers of material beneath the lowermost of the layers of material and unconnected to any of the layers of material and the first member;
   and simultaneously cutting the second member along with each of the layers of material and the first member.

15. A method of cutting the same pattern in each of a plurality of stacked separate unconnected layers of material by cutting means movable through a transverse passage with longitudinal and transverse movement occurring between the material and the cutting means, said method comprising:
   positioning a member of substantially the same size and width as each of the layers of material but thicker than any of the layers of material beneath the lowermost of the layers of material and unconnected to any of the layers of material;
   exerting a downward force on the layers of material and the member on each side of the cutting means in the longitudinal direction;
   and simultaneously cutting both the member and each of the layers of material to produce the same pattern in each of the layers of material.

UNITED STATES PATENT OFFICE
CERTIFICATE OF CORRECTION

Patent No. 3,585,888      Dated June 22, 1971

Inventor(s) James G. Wiatt

It is certified that error appears in the above-identified patent and that said Letters Patent are hereby corrected as shown below:

In the Abstract, lines 1 and 5, "nonwoven", each occurrence, should read -- non-woven --.

Col. 1, line 6, cancel "to"

line 20, cancel the "hyphen (-)"

line 24, "holddown" should be ---hold down--- line 27, "Holddown" should be ---Hold Down--- line 31, cancel the "hyphen (-)"

line 39, "holddown" should be ---hold down--- line 40, "holddown" should be ---hold down--- line 42, "holddown" should be ---hold down--- line 43, "holddown" should be ---hold down--- line 51, "through" should be ---though--- line 52, "holddown" should be ---hold down--- line 56, "holddown" should be ---hold down--- line 57, "holddown" should be ---hold down--- line 60, "holddown" should be ---hold down--- line 66, "holddown" should be ---hold down--- line 69, "holddown" should be ---hold down---

UNITED STATES PATENT OFFICE
CERTIFICATE OF CORRECTION

Patent No. 3,585,888      Dated June 22, 1971

Inventor(s) James G. Wiatt      PAGE - 2

It is certified that error appears in the above-identified patent and that said Letters Patent are hereby corrected as shown below:

Col. 2, line 3, "holddown" should be---hold down--- line 5, "holddown" should be---hold down--- line 21, "material" should be---Material--- line 39, "nonwoven" should be--- non-woven --- line 44, "nonwoven" should be--- non-woven --- line 47, "nonwoven" should be--- non-woven --- line 52, "nonwoven" should be--- non-woven ---

Col. 3, line 18 after "has" insert---a---

Col. 4, line 33, "holddown" should be---hold down--- line 67, "nonwoven" should be--- non-woven ---

Col. 5, line 2, "nonsmooth" should be--- non-smooth --- line 8, "nonsmooth" should be--- non-smooth --- line 17, "nonwoven" should be--- non-woven --- line 36, "nonsmooth" should be--- non-smooth --- line 40, "nonsmooth" should be--- non-smooth ---

Col. 6, line 24, "Nonreciprocating" should be--- Non-Reciprocating --- line 25, the "comma (,)" (second occurrence) should be a ---semi-colon (;)--- line 28, "holddown" should be---hold down--- line 31, "holddown" should be---hold down--- line 34, "Holddown" should be---Hold Down--- line 57, "holddown" should be---hold down--- line 62, "789,800" should be---789,880---

UNITED STATES PATENT OFFICE
CERTIFICATE OF CORRECTION

Patent No. 3,585,888     Dated June 22, 1971

Inventor(s) James G. Wiatt     PAGE - 3

It is certified that error appears in the above-identified patent and that said Letters Patent are hereby corrected as shown below:

Col. 7, line 15, "holddown" should be---hold down---

IN THE CLAIMS

Col. 7, line 62, "nonwoven" should be---non woven--- line 64, "nonwoven" should be--- non-woven --- line 66, "nonsmooth" should be--- non-smooth --- line 70, "nonsmooth" should be--- non-smooth ---

Col. 8, line 38, after "material" add---on the top layer of the layers of material---.

Signed and sealed this 16th day of May 1972.

(SEAL)
Attest:

EDWARD M. FLETCHER, JR.
Attesting Officer

ROBERT GOTTSCHALK
Commissioner of Patents